US009166278B2

United States Patent
Furukawa et al.

(10) Patent No.: US 9,166,278 B2
(45) Date of Patent: Oct. 20, 2015

(54) COMMUNICATION APPARATUS

(75) Inventors: Eiichi Furukawa, Tokyo (JP); Masahiro Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 227 days.

(21) Appl. No.: 13/824,136

(22) PCT Filed: Sep. 7, 2011

(86) PCT No.: PCT/JP2011/070360
§ 371 (c)(1),
(2), (4) Date: Mar. 15, 2013

(87) PCT Pub. No.: WO2012/043175
PCT Pub. Date: Apr. 5, 2012

(65) Prior Publication Data
US 2013/0181872 A1  Jul. 18, 2013

(30) Foreign Application Priority Data
Sep. 29, 2010  (JP) .................................. 2010-219081

(51) Int. Cl.
*H01Q 13/00* (2006.01)
*H01Q 1/24* (2006.01)
*H01P 11/00* (2006.01)
*H04B 1/40* (2015.01)
*H01P 3/12* (2006.01)

(52) U.S. Cl.
CPC .. *H01Q 1/24* (2013.01); *H01P 3/12* (2013.01); *H01P 11/002* (2013.01); *H04B 1/40* (2013.01)

(58) Field of Classification Search
CPC ....... H01Q 13/02; H01Q 21/24; H01Q 13/00; H01Q 1/12; H01Q 3/02; H01Q 15/12

USPC .......................................... 343/772, 778, 786
See application file for complete search history.

(56) References Cited

U.S. PATENT DOCUMENTS

| | | | | |
|---|---|---|---|---|
| 4,792,814 A | * | 12/1988 | Ebisui ........................... | 343/786 |
| 4,901,369 A | * | 2/1990 | Momose et al. ............... | 455/84 |
| 5,760,749 A | * | 6/1998 | Minowa et al. ............... | 343/772 |

(Continued)

FOREIGN PATENT DOCUMENTS

| | | |
|---|---|---|
| CN | 101010448 A | 8/2007 |
| EP | 0632525 A1 | 1/1995 |

(Continued)

OTHER PUBLICATIONS

Office Action mailed Jan. 28, 2014 in related Japanese Application No. 2012-536308 and partial English-language translation (8 pgs.).

(Continued)

*Primary Examiner* — Hoang V Nguyen
(74) *Attorney, Agent, or Firm* — Foley & Lardner LLP

(57) ABSTRACT

The purpose of the present invention is to reduce the cost of a product while ensuring reliability of the product as a wireless transmission/reception apparatus. Provided is communication apparatus (ODU) (1) installed outside, which includes a case that houses a transmission unit for transmitting a signal and a reception unit for receiving the signal, and a waveguide connected to an external antenna and configured to receive/ transmit a signal. In the apparatus, the waveguide is formed integrally with the case, and taper (16) is formed in a part of the tube hole of the waveguide.

19 Claims, 17 Drawing Sheets

(56) References Cited

U.S. PATENT DOCUMENTS

| | | | |
|---|---|---|---|
| 5,852,390 A | 12/1998 | Yoshimura | |
| 6,272,269 B1 * | 8/2001 | Naum | 385/43 |
| 6,301,464 B1 | 10/2001 | Yuanzhu | |
| 6,540,408 B1 | 4/2003 | Jinnai | |
| 7,511,678 B2 * | 3/2009 | Wu | 343/786 |
| 2008/0136565 A1 | 6/2008 | Paynter | |
| 2009/0109111 A1 | 4/2009 | McGonigle et al. | |
| 2010/0129661 A1 * | 5/2010 | Jung et al. | 428/412 |

FOREIGN PATENT DOCUMENTS

| | | |
|---|---|---|
| EP | 1071155 A2 | 1/2001 |
| EP | 2 221 910 A1 | 8/2010 |
| GB | 696900 | 9/1953 |
| JP | S61-214802 A | 9/1986 |
| JP | H03-248760 A | 11/1991 |
| JP | 9-139603 A | 5/1997 |
| JP | 11-284428 A | 10/1999 |
| JP | 2000-332524 A | 11/2000 |
| JP | 2001-156501 A | 6/2001 |
| JP | 2001-168611 A | 6/2001 |
| JP | 2002-057598 A | 2/2002 |
| JP | 2002-151921 A | 5/2002 |
| JP | 2006-197343 A | 7/2006 |
| JP | 2007-142184 A | 6/2007 |
| JP | H09-172307 | 6/2007 |
| JP | 2008-025785 A | 2/2008 |

OTHER PUBLICATIONS

Office Action mailed Mar. 18, 2014 in related South Korean Application No. 10-2013-7007664 and partial English-language translation (6 pgs.).

Chinese office action mailed Mar. 31, 2014 in related Chinese application No. 201180045815.6 with partial English-language translation (15 pgs.).

Partial Supplementary European Search Report mailed Nov. 21, 2014 in related European Application No. 11828736.6 (7 pgs.).

Extended European Search Report mailed Apr. 9, 2015 in related European application No. 11828736.6 (9 pgs.).

* cited by examiner

Fig.3
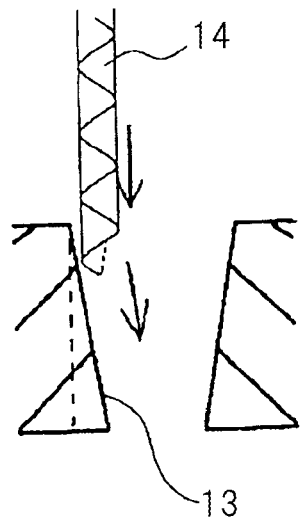
Fig.4
(a)
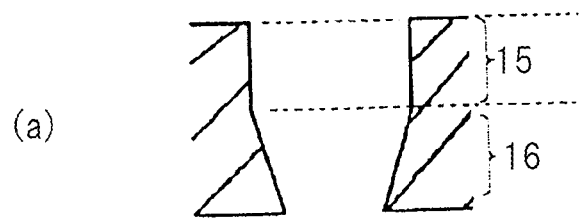
(b)
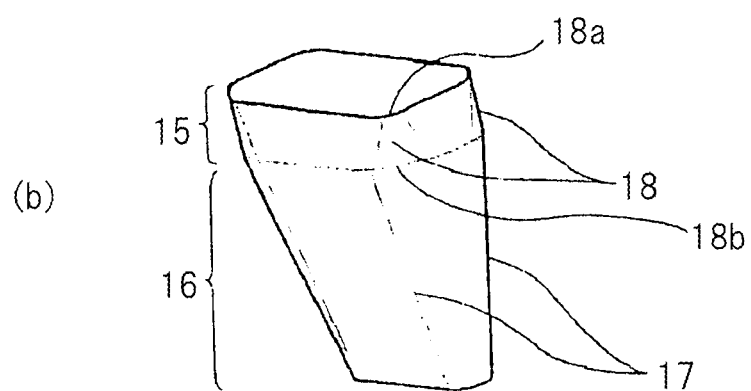

(a)

(b)

SMALL APERTURE DIFFERENCE          LARGE APERTURE DIFFERENCE (a) WAVEGUIDE ACCORDING            (b) WAVEGUIDE HAVING
    TO INVENTION                       ONLY TAPERED SHAPE

Fig.11
(a)
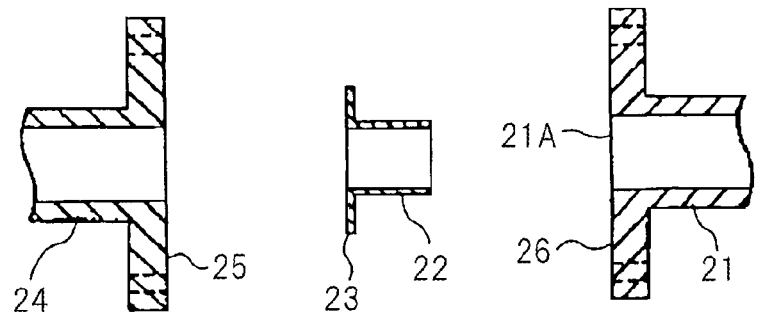
(b)
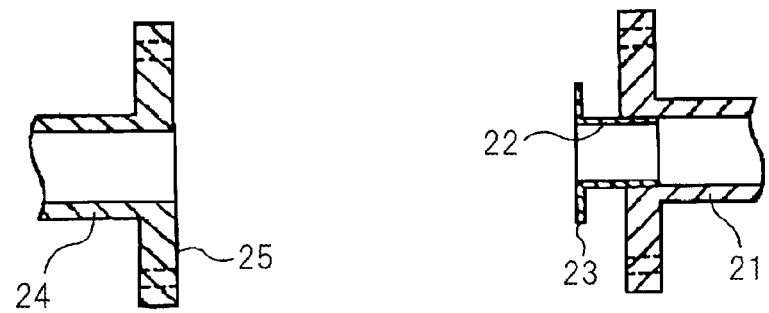
(c)
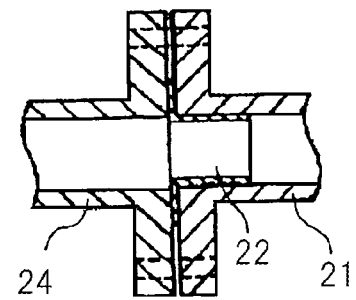

(a)　　　　　　　　　(b)

(a)　　　　　(b)　　　　　(c)

Fig.17
(a)
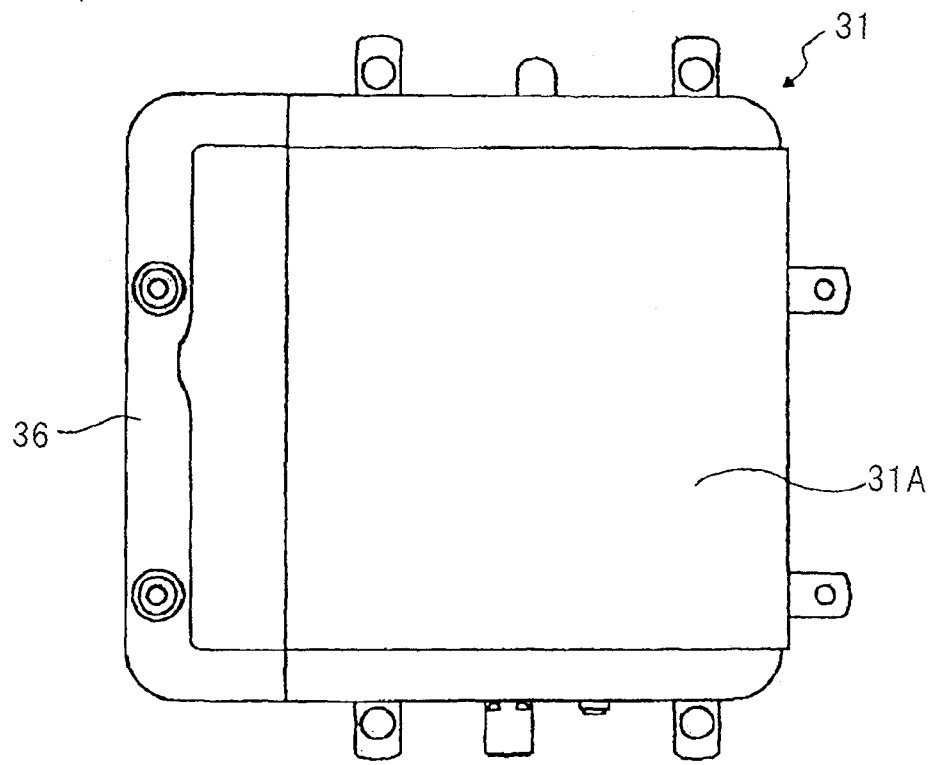
(b)
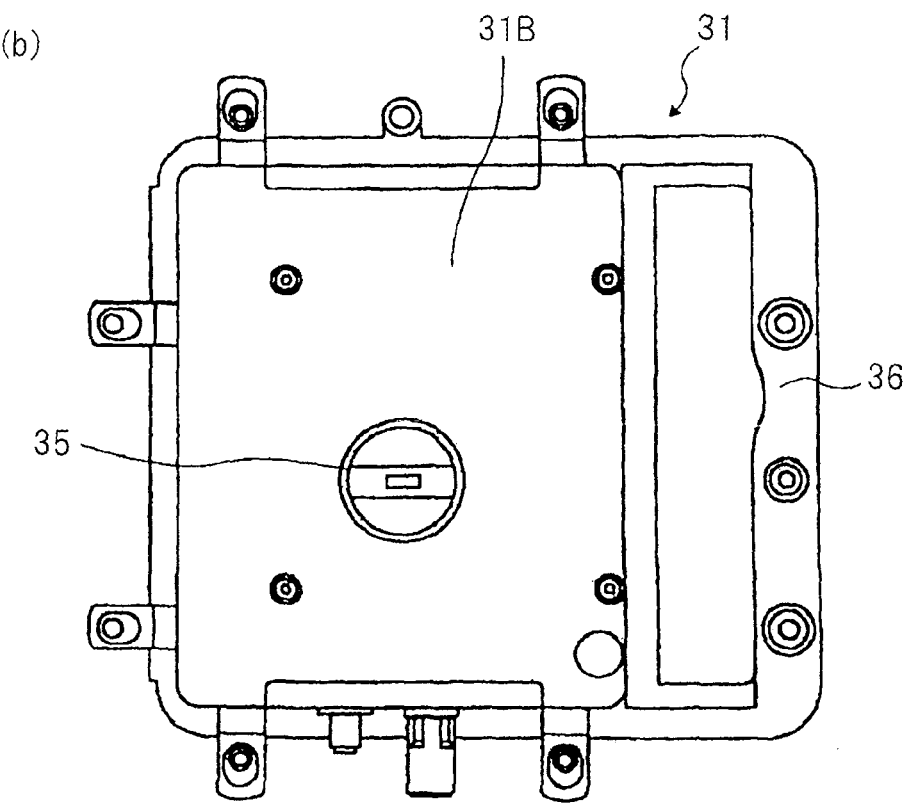

Fig.18
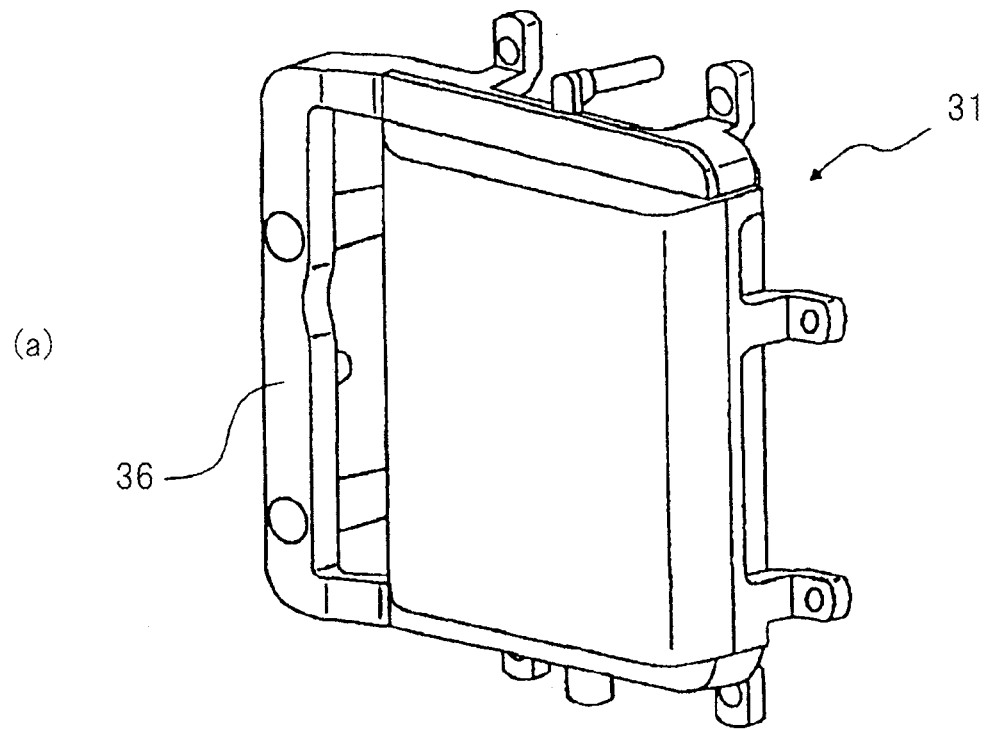
(a)
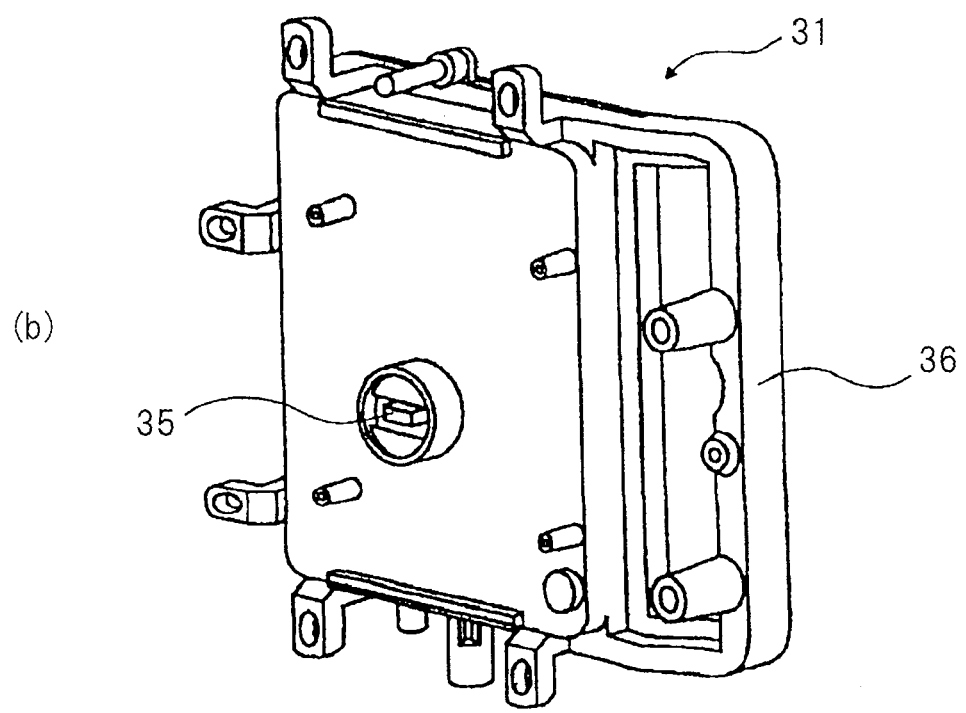
(b)

UNPROCESSED    PROCESSED

COMMUNICATION APPARATUS

TECHNICAL FIELD

The present invention relates to a communication apparatus installed outside, more particularly to the form of a waveguide connected to an antenna to transmit a signal, and the form of a case for housing a transmission unit and a reception unit.

BACKGROUND ART

In a mobile communication system represented by a portable telephone system, an access network is constructed to interconnect wireless base stations. In the access network between the wireless base stations, wire communication and wireless communication are used. The use of the wireless communication is particularly advantageous in that network construction costs can be reduced and design latitude, with respect to selecting the installation place of the wireless base station, can be increased. For the wireless communication between the wireless base stations, a wireless communication apparatus using microwaves is used. In such a wireless communication apparatus, an antenna must be installed at a highrise building such as a steel tower or the roof of a building having no obstacle. Such a wireless communication apparatus is divided into a wireless transmission/reception apparatus (hereinafter, ODU (outdoor unit)) installed close to the antenna installed outdoors and an indoor unit (hereinafter, IDU) installed separately from the ODU to modulate or demodulate a transmission signal, and both are connected to each other by a coaxial cable or the like (refer to JP2006-197343A (hereinafter, Patent Literature 1)). The ODU is installed at the high outdoor place with the antenna. The ODU is accordingly provided with only limited functions such as the function of transferring a signal to the antenna to achieve miniaturization and light weight. On the other hand, the IDU has complex functions such as those of modulating/demodulating and processing a signal. the IDU In a case that the IDU is installed indoors, maintenance of the IDU is facilitated and its reliability is improved.

The ODU has a structure where it is connected by using a waveguide to transfer the signal to the external antenna. For example, as described in JP2001-168611A (hereinafter, Patent Literature 2), the waveguide is manufactured by a component different from a case of the ODU in order to be attached to the case of the ODU, and connected to the waveguide of the antenna side via a waveguide connection component.

In the wireless communication apparatus that carries out the wireless communication between the base stations, the ODU is installed in a severe environment outdoors, even in the desert, a cold region, or the coast line in some cases, and a place where frequent maintenance or inspection is difficult (e.g., at the high place of the steel tower). This requires high environment resistance. Thus, precision electronic components such as the transmission circuit and the reception circuit constituting the ODU arc housed in a robust metal case.

For such an ODU, not only miniaturization and light weight but also low cost are required because of severe price competition, and there is a strong demand for reducing the number of components or operation steps for manufacturing. However, for example, in the apparatus described in Patent Literature 2, manufacturing not only the case but also the waveguide is necessary and a structure for attaching the waveguide to the ODU case is necessary. Needless to say, for portions in addition to the waveguide of the ODU, there is a strong demand for lower costs to be achieved by reducing the number of components or operation steps.

However, when the costs are reduced, the reliability (environment resistance, electric characteristics of the waveguide or the like) of the ODU of the wireless communication apparatus must naturally be ensured.

CITATION LIST

Patent Literature 1: JP2006-197343A
Patent Literature 2: JP2001-168611A

SUMMARY OF INVENTION

Problems to be Solved by Invention

The present invention has been developed to solve the aforementioned problem, and it is an object of the invention to reduce costs of a product while ensuring reliability of the product as the ODU of a wireless communication apparatus.

Solution to Problem

According to an aspect of the present invention, a communication apparatus installed outdoors includes: a transmission unit for transmitting a signal; a reception unit for receiving the signal; a waveguide connected to an external antenna and configured to receive/transmit a and a case for housing the transmission unit and the reception unit. In the apparatus, the waveguide is formed integrally with the case, and a taper is formed in a part of the tube hole of the waveguide.

According to another aspect, the waveguide is formed integrally with the case, and includes a straight shape portion formed with a fixed inner diameter size from one end to the other end of the waveguide, and a tapered shape portion inclined at a predetermined angle.

According to yet another aspect, the waveguide is formed integrally with the case, and the outer surface of the case is formed into a concave-convex shape without being painted.

BRIEF DESCRIPTION OF DRAWINGS

FIG. 3 is a view showing the appearance of processing the tube hole of the waveguide having the tapered tube hole.

FIG. 4 is explanatory views showing a waveguide shape according to a first embodiment of the present invention.

FIG. 11 is explanatory views showing a sliding sim used for connecting waveguides to each other.

FIG. 17 is front and rear views showing the ODU shown in FIG. 16.

FIG. 18 is perspective views showing front and rear views showing the ODU shown in FIG. 16.

REFERENCE NUMERALS

Figure 1:
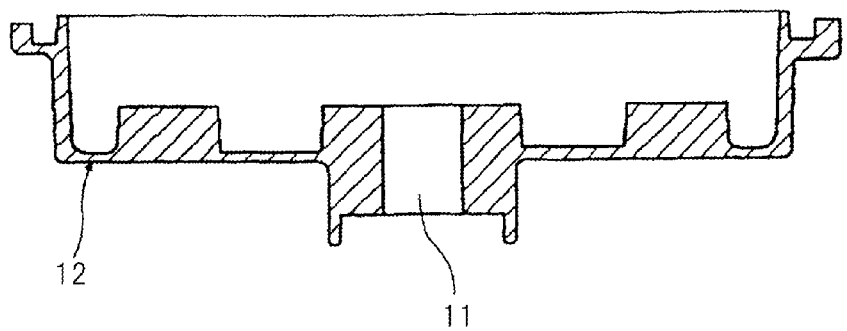
FIG. 1 is a sectional view showing the case of an outdoor wireless transmission/reception apparatus (ODU), a part of which is a waveguide.

11 Waveguide
12 Case of ODU
13 Slope of tapered portion
14 Drill
15 Straight shape portion
16 Tapered shape portion
17, 18 Corner portion
21 Waveguide portion of ODU side
21A Opening of waveguide portion 21
22 Cylindrical portion of sliding sim
23 Flange portion of sliding sim
24 Waveguide portion of ODU side
25 End surface of waveguide portion 24
26 End surface of waveguide portion 21
27 Opening of waveguide portion into which sliding sim is inserted
28 Inner wall of tube hole of waveguide
29 Aperture of cylindrical portion of sliding sim
30 Aperture of standard waveguide
31 Outdoor wireless transmission/reception apparatus (ODU)
31A Cover
31B Case
32 Nonferrous metal
32a Concave-convex portion
32b Oxide film
33 Antenna
34 Pole
35 Joint portion
36 Handle
41 A station (base station)
42, 52 IDU
43, 53 ODU
44, 54 Antenna
45, 55 Coaxial cable
51 B station (base station)
61 Multiplexer circuit
62 Transmission/reception circuit
63 Control circuit Description of Embodiment Hereinafter, the embodiments of the present invention will be described with reference to the drawings.

(First Embodiment)

First, the waveguide portion of an IDU will be described.

A waveguide, which is the input-output port of the ODU, is usually manufactured in a solid state as described in Patent Literature 2 because of high requirements regarding the aperture size and tolerance. To reduce manufacturing costs, provided is means for forming the waveguide to a case of the ODU by using a part of the case. The ODU case is made of strong metal because it is mainly required to function as a case for housing a precision electronic component such as a transmission circuit or a reception circuit, and is generally made of cast metal, especially a die-cast mold, in view of cost and processability. Thus, for example, as shown in FIG. 1, waveguide 11 and ODU case 12 may be integrally manufactured by using a cast metal.

The advantage of this form in terms of costs is that the ODU case and the waveguide can be formed by the cast metal at one time. However, a taper is normally formed to reduce mold release resistance when a cast is released form a mold. The tube hole shape of the waveguide is preferably straight (no taper) for electric characteristics, and the taper may adversely affect the electric characteristics. For example, even when the aperture size of one waveguide end is an ideal size for the electric characteristics, e.g., a size meeting the EIAJ (Electronic Industries Association of Japan) standard, the aperture size of the other waveguide end deviates from the ideal size in according with a taper angle or a waveguide length. In other words, as the taper angle or the waveguide length increases, the aperture size deviates from the standard, consequently causing the electric characteristics of the waveguide to deteriorate. Conversely, when the waveguide is short or the taper angle is small, the electric characteristics are not greatly affected since the change of the waveguide aperture size is limited.

The influence on the electric characteristics when the taper angle is formed on the side face of the tube hole of the waveguide has been described. However, from a mechanical standpoint, such as manufacturing, there are certain restrictions on the taper angle. for example, even in the case of a taper angle, such as 10°, where mold releasing may be easy, as the length of the portion decreases, the tube hole shape of the waveguide almost approaches a straight shape, and mold release resistance in which a cast product is pulled out of a mold is increased.

Thus, concerning the taper angle, it must be comprehensively determined in view of the length of the portion that defines the angle and the size of mold release resistance. Further, how electric characteristics can be acquired within its range must be taken into consideration.

A specific example will be described. In view of cast metal manufacturing, a taper angle of, for example, 2° to 5°, is normally necessary. For example, it is assumed that in the rectangular waveguide of a size WRJ-220 that satisfies EIAJ Standard TT-3006A, a taper is formed so as to reduce aperture size S (10.668×4.318 mm) of one end of the waveguide toward the other end side. When the length of the waveguide is 20 mm, with a taper angle of 0.5°, a size difference of 0.175 mm is generated for each side, and the aperture size of the other waveguide end is 10.318×3.968 mm. With a taper angle of 2°, a size difference of 0.700 mm is generated for each side, and aperture size S1 of the other waveguide end (FIG. 2) is 9.268×2.918 mm. With a taper angle of 5°, a size difference of 1.750 mm is generated for each side, and aperture size S2 of the other waveguide end (FIG. 2) is 7.168×0.818 mm. In short, with the taper angle of 2° to 5°, even in the case of the waveguide having a length of 20 mm, the aperture change of the waveguide is great as described above. Consequently, the lowest frequency transmittable by the waveguide (cutoff frequency) is greatly changed at both ends of the waveguide. In the present invention, the rectangular waveguide having the aperture size meeting the EIAJ Standard may also be referred to as a standard waveguide.

Figure 2:
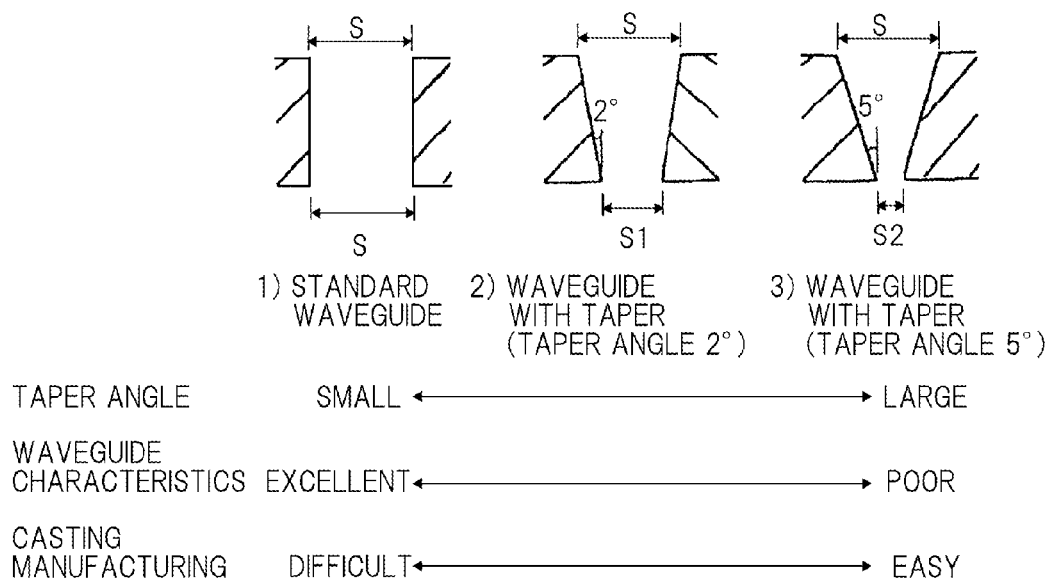
FIG. 2 is an explanatory view showing a relationship among the tapered angle of the tube hole of the waveguide, waveguide characteristics, and casting manufacturing.

Thus, as shown in FIG. 2, since the taper angle is larger, deterioration of the electric characteristics of the wave guide is greater while cast mold manufacturing and durability are improved. Conversely, since the taper angle is smaller, cast mold manufacturing and durability deteriorate while waveguide characteristics become better. In other words, these are contradictory to each other.

As another possible manufacturing method of the rectangular waveguide, a waveguide is formed into a rough shape by a cast mold, and then only a taper portion is scraped oft to make the inner diameter of the waveguide constant. However, as shown in FIG. 3, a cutting operation is difficult because drill 14 can easily slide along slope 13 of the taper portion. To improve cutting performance, a drill having a diameter as large as possible is generally used.

For example, to reduce round shapes R of the corner portions of the four corners of the rectangular tube hole of the waveguide made of the cast mold, the diameter of the drill must be reduced. However, whereas the drill must be long when the waveguide is long, the small-diameter drill is generally short, and increasing the dill length is an improper condition. The small-diameter drill easily slides because it is more pliable than a large-diameter drill. This tendency is stronger when the drill is longer, and the drill is easily broken. Thus, in real scenes, frequently, there is no choice but to select the large-diameter drill. In this case, the curvature radius of the round shape R of the corner portion in the tube hole of the rectangular waveguide is larger according to the drill diameter, affecting the electric characteristics of the rectangular waveguide.

Thus, when the waveguide and the ODU case arc integrally manufactured using the cast metal, it is difficult to acquire both excellent manufacturing performance and electric characteristics for the waveguide portion. Further, in order to the precise fabrication of the waveguide portion, cutting the waveguide portion after the waveguide portion and the case portion are integrally casted as having the taper angle leads to the increase of manufacturing costs.

Therefore, the present invention proposes, as regards a cast ODU case partially formed as a waveguide, a shape that enables use of a waveguide portion in its removed state from a mold and maintenance of electric characteristics of the waveguide without causing a major deterioration in the cast mold manufacturing performance.

Figure 5:
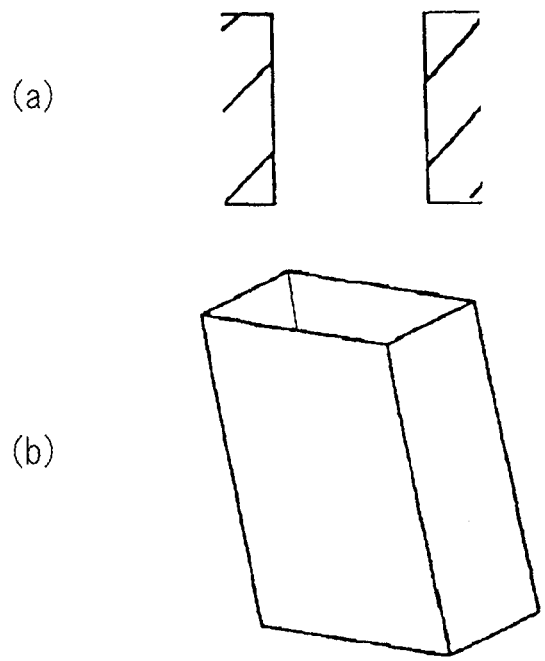
FIG. 5 is explanatory views showing a standard waveguide shape.

FIGS. 4A and 4B are respectively a cross sectional view and a perspective view of the waveguide portion according to the present invention. FIG. 5A shows a general waveguide portion, and FIG. 5B is its perspective view. As shown in FIGS. 5A and 5B, the normal waveguide shape is rectangular, and the inner diameter size (four-side size of rectangular opening) from one waveguide end to the other waveguide end is fixed. On the other hand, as shown in FIG. 4A, the waveguide shape of the present invention includes straight shape portion 15 formed with a predetermined length from one waveguide end to the other waveguide end, and tapered shape portion 16 formed to be smaller in the inner-diameter side to the other waveguide end following straight shape portion 15.

Tapered shape portion 16 includes two pairs of side faces inclined at predetermined taper angles. Corner portion 17 of tapered shape portion 16 is pointed without being formed into a round shape R. Straight shape portion 15 includes two pairs of parallel side faces and four corner portions 18 formed at four corners. Corner portion 18 of straight shape portion 15 is formed into a round shape R to acquire easy mold releasing and mold durability. Further, a taper can be formed in corner portion 18 so that a curvature radius can be larger as it gets closer to tapered shape portion 16. For example, a curvature radius R at portion 18a of corner portion 18 on the waveguide end side is 1 mm, and a curvature radius R at portion 18b of corner portion 18 adjacent to tapered shape portion 16 is 1.5 mm. By increasing the round shape R of corner portion 18 from one end of the waveguide to the other end side, removal from the mold can be facilitated, and the durability of the mold can be improved.

Tapered shape portion 16 may be designed according to a need because of its easy removal from the mold by its taper. It becomes better as the tube length of straight shape portion 15 gets shorter when priority is given to easy removal and mold durability, and it becomes better as the tube length of straight shape portion 15 gets longer when priority is given to the electric characteristics. Thus, straight shape portion 15 is designed in view of balance between both conditions and a casting technology.

Figure 6:
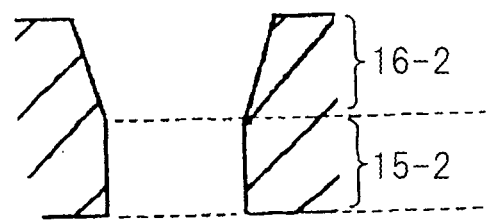
FIG. 6 is a view showing another example of a waveguide shape according to the first embodiment.

In the case of the waveguide shape shown in FIGS. 4A and 4B, tapered shape portion 16 and straight shape portion 15 are arranged in this order in a mold releasing direction (from bottom up on a surface of a drawing paper). However, the present invention is not limited to this shape. For example, as shown in FIG. 6, straight shape portion 15 and tapered shape portion 16 can be arranged in this order in the mold releasing direction (from bottom up on shown paper surface). The waveguide shape shown in FIG. 6 includes tapered shape portion 16-2 formed with a predetermined length from one waveguide end to the other waveguide end, and straight shape portion 15-2 termed with a fixed inner diameter size from tapered shape portion 16-2 to the other waveguide end following the portion 16-2.

Figure 7:
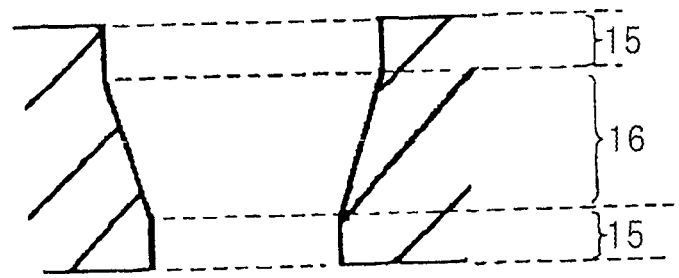
FIG. 7 is a view showing another example of a waveguide shape according to the first embodiment.
Figure 8:
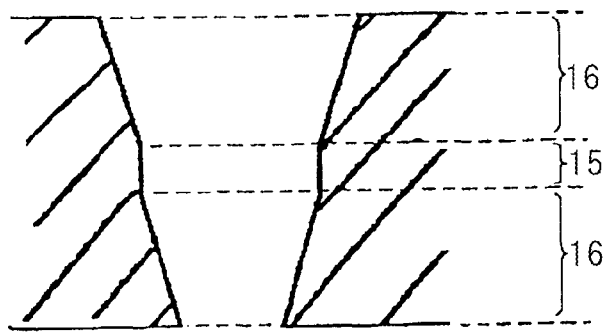
FIG. 8 is a view showing another example of a waveguide shape according to the first embodiment.

Further, as shown in FIG. 7, the waveguide may be configured by forming straight shape portions 15 at both ends of the waveguide and forming tapered shape portion 16 between straight shape portions 15. As shown in FIG. 8, the waveguide may be configured by forming tapered shape portions 16 at both ends of the waveguide and forming straight shape portion 15 between tapered shape portions 16. In other words, the object of the present invention can be achieved even by the waveguide shape where at least one portion from among straight shape portion 15 and tapered shape portion 16 is disposed at two stages or more.

As described above, according to the present invention, the waveguide portion formed as a part of the cast ODU case is configured by combining the straight shape portion with the tapered shape portion, and thus cast metal manufacturing performance and electric characteristics of the waveguide are simultaneously achieved. In particular, for the tapered shape portion, by forming the corner portions of the four corners into the round shapes R, mold releasing easiness is improved. For the tapered shape portion, its taper angle is set to an angle that does not affect the electric characteristics but that facilitates mold releasing. Thus, cast metal manufacturing performance and electric characteristics of the waveguide are simultaneously achieved. For the round shapes R of the corner portions of the four corners of the straight shape portion, the curvature radiuses R are set to levels that does not affect mold releasing easiness and the electric characteristics, and thus both can be achieved. When the waveguide portion is designed this way, the electric characteristics of the waveguide portion are maintained without any additional processing after removal of the case from the cast mold. Thus, manufacturing costs can be greatly reduced compared with the conventional ODU case.

SPECIFIC EXAMPLE

The waveguide shape according to the present invention will be further described by taking the specific example of the aperture (size: 10.688×4.318 mm) of a rectangular waveguide having a size WRJ-220 that satisfies the EIAJ Standard.

According to the present invention, the corner portion of the waveguide is formed into the R shape from the mechanical viewpoint, such as productivity of a cast metal. In this case, in view of the influence on a cut-off frequency, the round shape R is formed to increase only the size of the long side of the tube hole. For example, by forming the curvature radius R to have a round shape set to 1.5 mm at the corner of the tube hole of the rectangular waveguide having the site WRJ-220, the aperture size of the rectangular waveguide is increased to about 11.100×4.318 min.

With this increased aperture size, for example, the opening of straight shape portion 15 is formed at one end of the waveguide shown in FIGS. 4A and 4B. Straight shape portion 15 is formed with a predetermined length from the opening of this one waveguide end. Further, tapered shape portion 16 is formed so that its inner diameter size can be smaller from straight shape portion 15 toward the other end side of the waveguide.

When the overall length of the waveguide is 20 mm, for example, straight shape portion 15 is set to 5 mm, and tapered shape portion 16 is set to 15 mm. At corner portion 18 of straight shape portion 15, a taper is formed so that a curvature radius can be gradually changed from 1.5 R to 2 R from the opening of one waveguide end closer to tapered shape portion 16 (refer to FIG. 4B). Tapered shape portion 16 is formed at a predetermined taper angle so that its inner diameter size can be smaller toward the other waveguide end (shown lower side).

In this waveguide shape, when the length of straight shape portion 15 was about 5 mm, the influence on cast metal manufacturing performance was limited. Further, in this specific example, because of the tapers formed at corner portions 18 of straight shape portion 15 as described above, mold releasing is easier.

Figure 9:
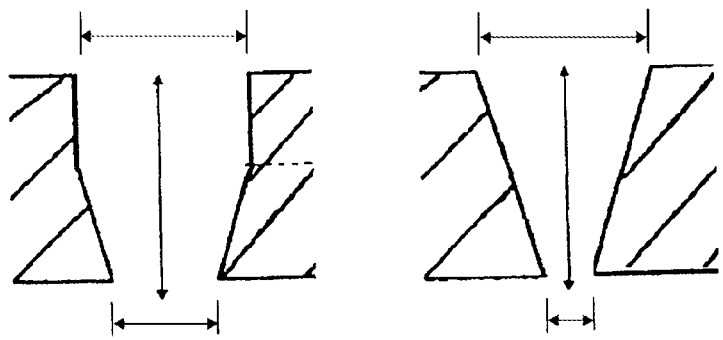
FIG. 9 is explanatory views showing aperture differences between both tube ends in the waveguide shape according to the first embodiment and a waveguide having a tube hole with only a taper.

For tapered shape portion 16, compared with the case where the taper is formed over the entire length 20 mm of the tube hole, the change of the aperture size is smaller since it is shorter by 15 mm. In other words, the aperture difference between both ends of the waveguide can be reduced. For example, in the case of a taper angle of 2°, when a taper was formed with an entire length of 20 mm, a difference of 0.700 mm was generated for each side. On the other hand, when a taper is 15-mm long, there is only a difference of 0.524 mm for each side (difference between both: 0.176 mm, change of waveguide aperture at time of 15 mm is from 10.688×4.318 to 9.62×3.270 mm). Further, in the case of a taper angle of 5°, when a taper was formed with an entire length of 20 mm, a difference of 1.750 mm was generated for each side. On the other hand, when a taper is 15-mm long, there is only a difference of 1.312 mm for each side difference between both: 0.438 mm, change of waveguide aperture at time of 15 mm is from 10.688×4.318 to 8.044×1.694 mm). For the aperture difference between both ends of the waveguide, refer to FIGS. 9A and 9B showing a comparison between the waveguide according to the present invention and the waveguide entirely constituted of a taper.

By limiting easily mold-released tapered shape portion 16 to the predetermined length with respect to the total length of the waveguide, deviation from the standard of the aperture size is prevented, and the electric characteristics of the waveguide can be maintained.

Figure 10:
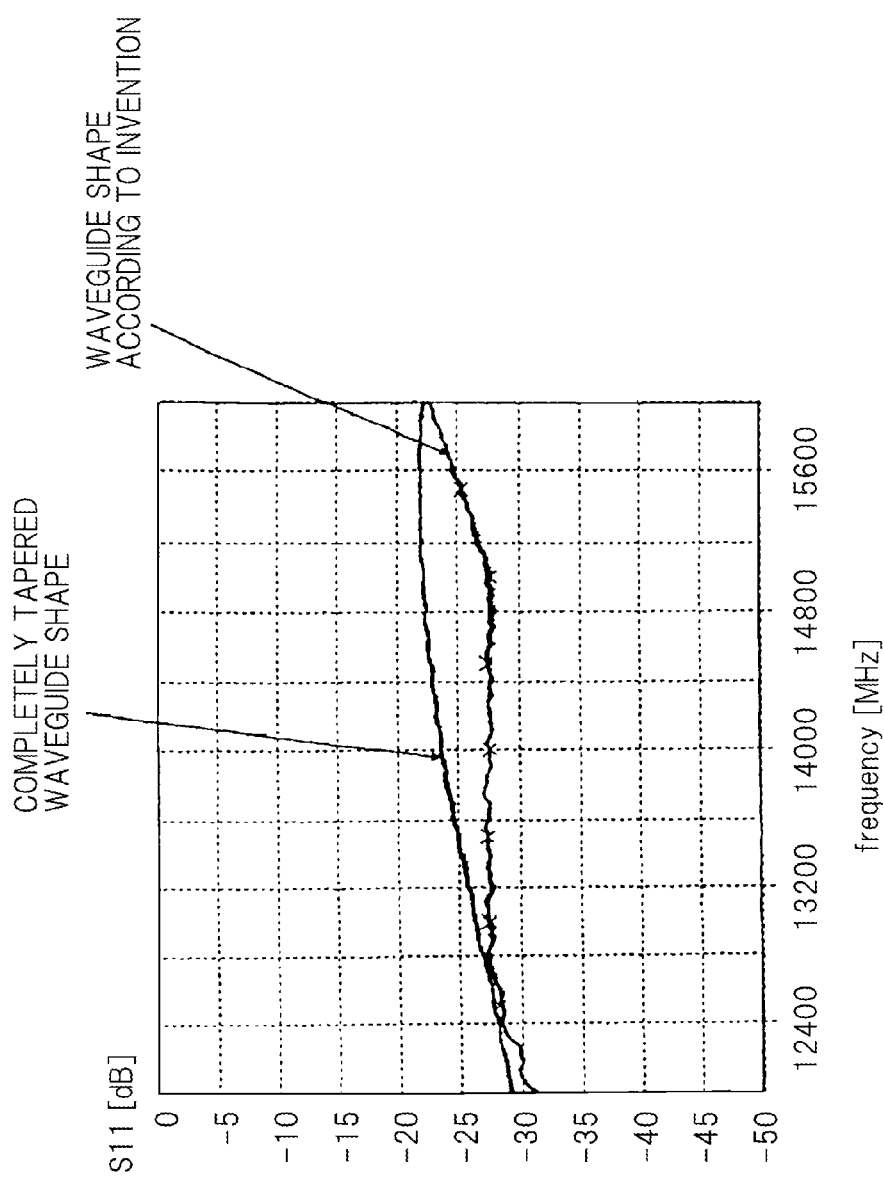
FIG. 10 is a graph showing the comparison of reflection characteristics between the waveguide shape according to the first embodiment and the waveguide having the tube hole with only the taper.

FIG. 10 is a graph showing the comparison of electric characteristics between one sample of the waveguide shape including the straight shape portion and the tapered shape portion according to the present invention and the waveguide entirely constituted of a taper. The graph of FIG. 10 about reflection characteristics (S11) shows that characteristics are better toward the lower side. From this graph, it can be understood that the waveguide shape according to the present invention has improved reflection characteristics improved compared with those of the waveguide entirely constituted of the taper. Specifically, within the range of 13000 to 16000, improvement up to 6 dB is achieved.

In this specific example, the aperture size of the waveguide standard is increased because of the round shape R of corner portion 18 of straight shape portion 15. However, at around 15 R described above, the size of the long side of the tube hole is only slightly larger than the standard, and thus the influence on waveguide characteristics such as a cut-off frequency is limited. Further, by not forming corner portion 18 of straight shape portion 15 into a pointed shape but into the round shape R, easy removal from the mold and mold durability are improved. In other words, by setting the round shape corner portion 18 to about 1.5 R in the straight shape portion, cast metal manufacturing performance and electric characteristics of the waveguide are both maintained.

Representative casting materials usable for forming the case including the waveguide portion according to the present invention are an aluminum alloy such as ADC 3, ADC 6, ADC 10, and ADC 12 and a zinc alloy such as ZDC 2 and ZDC 1. Needless to say, other materials manufactured by a method generally compliant with cast products can be applied to the present invention.

SPECIFIC EXAMPLE 2

Next, another specific example capable of effectively using the waveguide shape according to the present invention will be described.

When a gap is generated between the end surfaces of the waveguides during connection of the ODU and the antenna waveguide, a reflected wave is generated at the connection portion, and loss (reflection loss) based on this is greater. To eliminate such a reflection loss at the waveguide connection portion, a sliding sim described in JP3351408B2 is sometimes used.

As shown in FIG. 11A, the sliding sim includes cylindrical portion having an outer diameter almost equal to the inner diameter of waveguide portion 21 of the ODU, and flange portion 23 formed outward at one end of cylindrical portion 22. The sliding sim is made of, for example, stainless metal.

After such a sliding sim has been prepared, as shown in FIG. 11B, the other end of cylindrical portion 22 of the sliding sim, namely, an end where flange portion 23 is not formed, is inserted from opening 21A of waveguide portion 21 of the ODU. Since the outer diameter of cylindrical portion 22 is almost equal to the inner diameter of waveguide portion 21, cylindrical portion 22 can be slid in waveguide portion 21.

Then, waveguide portion 21 of the ODU side and waveguide portion 24 of the antenna side are aligned, and end surface 25 of waveguide portion 24 comes into contact with flange portion 23 of the sliding sim. In this state, as shown in FIG. 11C, waveguide portion 21 is pressed to waveguide portion 24 side, and cylindrical portion 22 of the sliding sim is completely inserted into waveguide portion 21. Then, by using bolts or the like, waveguide portions 21 and 24 are fastened together. Thus, since a gap generated between end surfaces 25 and 26 of connected waveguide portions 21 and 24 is covered with cylindrical portion 22 of the sliding sim, the reflection loss at the waveguide connection portion is reduced. The waveguide of the present invention easily becomes acclimated to such a sliding sim. This will be described below in detail.

Figure 12:
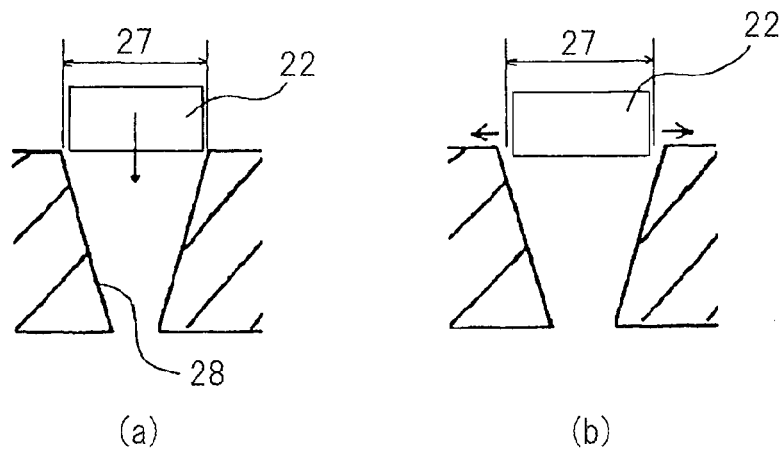
FIG. 12 is explanatory views showing a problem when the sliding sim is combined with a waveguide having a tube hole with a taper.

When the sliding sim is used in combination with the rectangular waveguide of a tapered tube hole similar to that shown in FIG. 9B, as shown in FIG. 12A, cylindrical portion 22 of the sim may not be inserted into the waveguide portion because of its interference with inner wall 28 of the tube hole. In view of this, as shown in FIG. 12B, the aperture of opening 27 of the waveguide portion must be increased to a size that enables insertion of cylindrical portion 22 without any interference with inner wall 28. This imposes great restrictions on designing.

Figure 13:
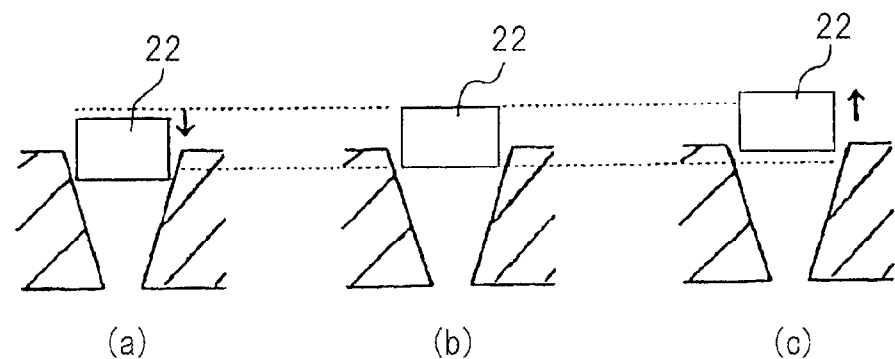
FIG. 13 is explanatory views showing a problem when the sliding sim is combined with the waveguide having the tube hole with the taper.

In this case, not only an aperture difference between the sim and the waveguide portion of the side where the sim is inserted is very large but also the movable range of the sim with respect to the waveguide aperture is large. As a result, the cylindrical portion of the sim shifts from the center axis of the waveguide. Since a taper is formed in the inner wall surface of the waveguide, depending on the incursion amount of the sim into the waveguide, the clearance between the cylindrical portion of the sim and the inner wall of the waveguide changes (refer to FIGS. 13A to 13C). In particular, when the attaching position of the sim shifts from the center axis of the waveguide, a very large characteristic change occurs, causing a deterioration in passage characteristics or a deterioration in reflection characteristics in a pass band, in some cases.

To prevent this, the above-mentioned clearance or the influence due to a change of the clearance must be taken into consideration in designing, and care must be taken to prevent positional shifting during sim attaching. Thus, affinity between a waveguide that is entirely composed of the taper and the sliding sim is not so high.

Therefore, using the sliding sim for the tapered shape portion is problematic. However, according to the present invention, the straight shape portion is formed at at least one of the ends of the waveguide. Thus, the problem can be solved by using the sliding sim for the straight shape portion.

Figure 14:
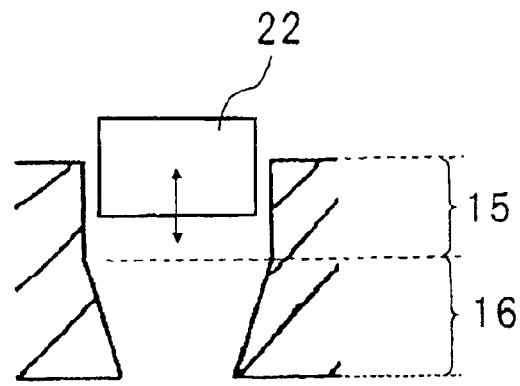
FIG. 14 is an explanatory view showing a configuration when the waveguide shape according to the present invention is applied to the sliding sim.

Specifically, as shown in FIG. 14, it is desirable to match straight shape portion 15 of the waveguide shape according to the present invention to the range within which cylindrical portion 22 of the sliding sim is inserted/pulled out from the tube hole of the waveguide portion. Thus, no difference is generated in clearance with the inner wall of the tube hole of the waveguide depending on the incursion amount of the sim, and a major change in characteristics change can be prevented.

Further, by using a boundary between straight shape portion 15 and tapered shape portion 16 of the waveguide shape shown in FIG. 14 as a mold division surface, cast metal accuracy can be achieved separately for both portions. For example, in straight shape portion 15 into which the sim is inserted, high cast metal accuracy is required to prevent deterioration in characteristics caused by a sim assembling error. On the other hand, in tapered shape portion 16 into which the sim is not inserted, high cast metal accuracy is not required because only characteristics of the waveguide can be kept. In the waveguide portion having the tube hole with only the taper, to increase accuracy, the accuracy must be increased over the entire length. In the present invention, accuracy can be set only for a necessary portion, and a mold can be efficiently manufactured.

The desirability of matching the straight shape portion of the waveguide portion, according to the present invention, to the range within which the sliding sim is inserted/pulled out has been described (refer to FIG. 14). However, when the sliding sim is used for the rectangular waveguide (hereinafter, standard waveguide) of the aperture that satisfies the EIAJ Standard, the outer diameter of the sim cylindrical portion must be smaller than the aperture of the standard waveguide). Thus, the inner diameter of the sim cylindrical portion is against from the aperture that satisfies the EIAJ Standard by the thick portion of the side wall of the sim cylindrical portion, which consequently causes a deterioration in electric characteristics.

Figure 15:
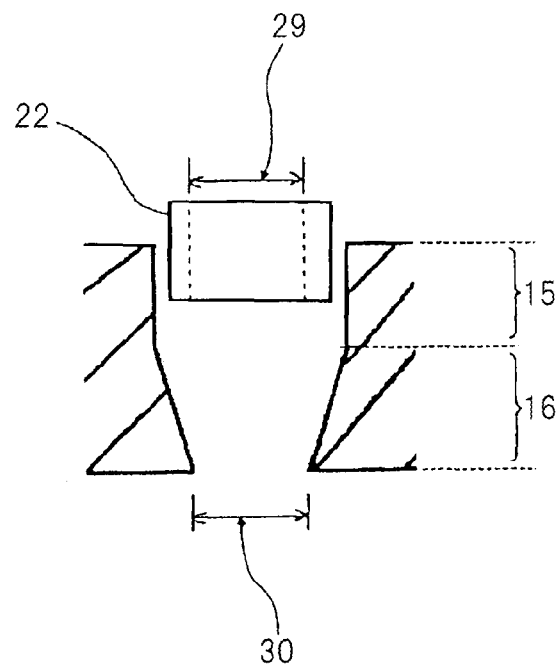
FIG. 15 is an explanatory view showing a configuration when the waveguide shape according to the present invention is applied to the sliding sim.

Thus, in addition to the method for matching the straight shape portion of the waveguide portion to the range within which the sliding sim is inserted/pulled out, as shown in FIG. 15, it is desirable to design the aperture size of straight shape portion 15 so that standard waveguide aperture 30 opposite the side where cylindrical portion 22 of the sliding sim is inserted and aperture 29 of cylindrical portion 22 can be equal to each other. Further, it is desirable to design tapered shape portion 16 so that its tapered tip aperture can be equal to standard waveguide aperture 30. Accordingly, one end whose aperture is larger than the aperture of both waveguide ends is the actual passage port where aperture 29 of cylindrical portion 22 is equal to standard waveguide aperture 30, and the other end has standard waveguide aperture 30. Thus, in an electrical viewpoint, the apertures of both ends are electrically sizes of the standard waveguide.

Thus, in the waveguide portion including the straight shape portion and the tapered shape portion according to the present invention, weak points can cancel each other out when combined with the sliding sim, and affinity is very good.

(Second Embodiment)

Next, the other portions of the waveguide, especially the outer portion of the ODU case, will be described.

The ODU may be installed in a very adverse outdoor environment. Thus, resin paint is normally applied on the surface of a metal case that houses a precision electronic component such as a transmission/reception circuit in view of durability and corrosion resistance. Such paint can increase the reliability of an apparatus by delaying the progress of corrosion of the metal case included in the ODU. Further, white paint if used has an effect to not conduct heat easily into the ODU by preventing absorption of sunlight in the metal case, Such paint is expensive.

However, because of the aforementioned severe price competition, there is a demand for much lower costs. To meet the demand, the inventors have studied the nonuse of expensive paint on the surface of the ODU case. As a measure that is taken to address environmental problems, paints that use organic solvents are not used to paint the surfaces of OUDs.

However, when the case is installed without being painted in an adverse severe outdoor environment for a long time, there is a possibility that case corrosion or the like will adversely affect the precision electronic component in the ODU. Mass production and cost reduction can be achieved by casting the ODU case. However, in the case of a cast that is in a state of having been removed from a mold, hot-water flow patterns or mold traces are generated and appear on the surface.

Thus, cost reduction by causing to use the paint has created the possibility that the reliability and even the product value of the ODU of the wireless transmission/reception apparatus may be lowered.

The inventors have studied a method capable of ensuring the reliability of the ODU, such as improved corrosion resistance without applying an expensive paint to the surface of the metal case, and have discovered the following invention as a result. The second embodiment is also applied to a case that has the waveguide portion of the first embodiment.

Figure 16:
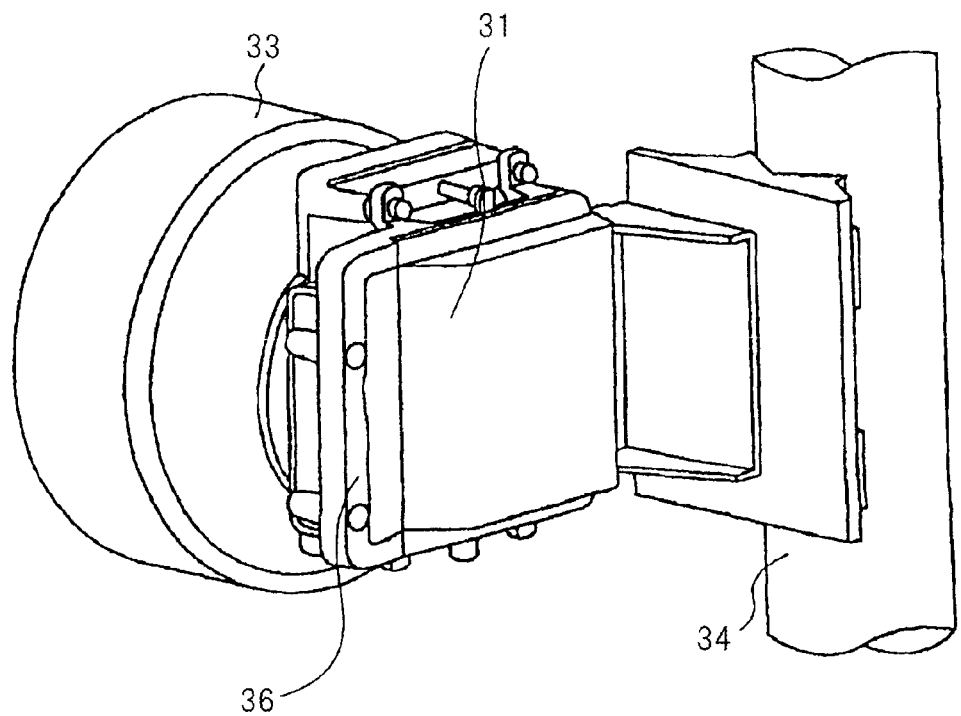
FIG. 16 is a perspective view showing an appearance when an ODU according to a second embodiment is installed.

FIG. 16 is a perspective view showing the ODU according to the second embodiment when the ODU is installed. ODU 31 of this embodiment shown in FIG. 16 includes a transmission unit (not shown) for transmitting a wireless signal, a reception unit (not shown) for receiving the wireless signal, and a case for housing at least these units. As shown in FIG. 16, as an example. antenna 33 is fixed to ODU 31. Antenna 33 is for transmitting the wireless signal from the transmission unit to the outside, and for receiving the wireless signal transmitted to the reception unit from the outside, and ODU 31 includes a joint portion (refer to reference numeral 35 in FIG. 18B). ODU 31 is attached and fixed to pole 34 erected on a building root.

FIGS. 17A and 17B are respectively a front view and a rear view showing ODU 31. FIG. 18A is a perspective view showing the front side of ODU 31, and 18B is a perspective view showing the rear side of ODU 31. The case of ODU 31 shown in FIGS. 17A and 17B is configured by combining cover 31A and case 31B. Further, the case houses the transmission unit and the reception unit. ODU 31 includes handle 36 to improve portability and facilitate setting of a transmission/reception direction. Handle 36 can be integrally formed with case 31B. When the case and handle 36 are integrally formed, the number of components can be reduced.

Such a case portion is made of nonferrous metal. The case portion of ODU 31, which can be manufactured by cutting, is formed by a die-cast method in the case of mass production. As a material for the case, nonferrous metal is used. Examples of nonferrous metals include aluminum, an aluminum alloy, or a zinc alloy. Such nonferrous metal is suitable for the case of ODU 31 because it is light, easily processed, and easily formed by the die-cast method. The forming by the die-cast method facilitates mass production and reduces costs.

Figure 19:
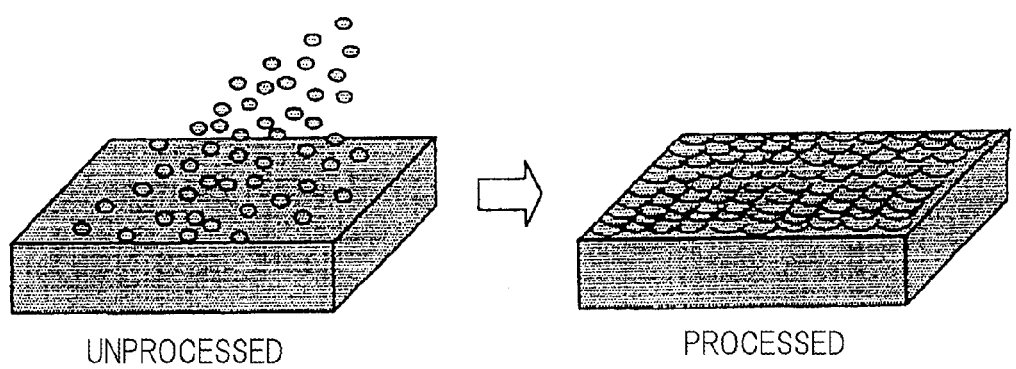
FIG. 19 is a view showing an appearance when the surface of an ODU case according to the present invention is formed into a concave-convex shape.

On the outer surface of the ODU case thus manufactured, according to the present invention, and that is not painted, concave-convex patterns were continuously formed on the entire surface of the nonferrous metal by uniformly spraying powders to the surface of the nonferrous metal at a high speed. The concave-convex patterns are collision traces. Concave-convex patterns were similarly formed on the surface of the nonferrous metal constituting handle 36. When handle 36 is integrally formed with the case, this is an efficient way of manufacturing the case and handle because the case and handle can be processed together. FIG. 19 shows an appearance when such concave-convex patterns are formed.

As powders, stainless steel, glass bead, or aluminum oxide (alumina) powders can be used. As a power spraying device, a rotary impeller (impeller type) or air-nozzle type shot-peening device can be used.

The concave-convex pattern formation on the surface will be described more in detail.

A physical operation on the surface layer of an aluminum alloy, when the nonferrous metal of the case of ODU 31 is an aluminum alloy and when powder sprayed thereto are stainless steel powders, will be described.

For example, when the particle diameter of the stainless steel powder is 0.5 mm (specific gravity: $\rho=7.8$ g/cm$^3$), and the collision speed V of the powder to the aluminum alloy is 50 m/s, the energy of one powder at the time of collision is $4.786 \times 10^{-4}$ [J] because of $E=1/2$ mV$^2$ (m=$\rho 4/3 \times_{TTr} 3$). When such collision energy is applied to the surface of the aluminum alloy, it is expected that the surface temperature of the aluminum alloy will instantaneously increase to nearly 1000° C.

The instantaneous application of such a high temperature to the surface of the aluminum alloy, whose melting point is around 700° C., may cause fine remelting on the surface layer of the aluminum alloy. The same phenomenon may occur even in the nonferrous metal such as an aluminum alloy (melting point of 660° C.) or a zinc alloy (melting point of around 600° C.), whose melting point is equal to or less than 1000° C.

Figure 20:
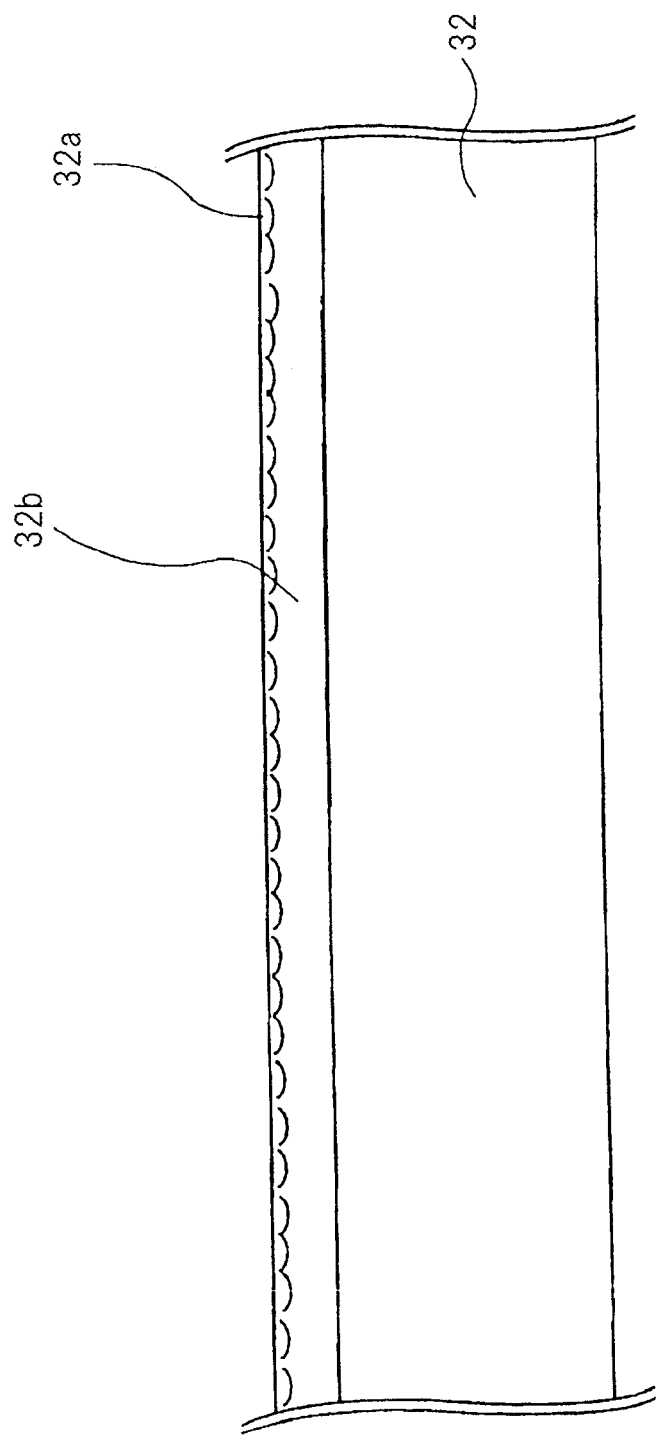
FIG. 20 is a schematic sectional view showing the outer surface and the inside of a nonferrous metal forming the ODU of the case shown in FIG. 17.

By such a physical operation on the surface layer of the aluminum alloy, namely, instantaneous heating, cooling, and compression stress, the outer surface layer of the aluminum alloy is modified to a state that includes a dense metal organization and an oxide film. FIG. 20 is a schematic sectional view showing the outer surface and the inside of the noferrous metal where the concave-convex patterns are formed. As shown, concave-convex patterns 32a are formed on the outer surface of nonferrous metal 32, and the outer surface is modified to be oxide layer 32b by remelting.

Specifically, by heat generated at the time of high-speed collision of fine-particle powders with the surface of the nonferrous metal, a series of operations including remelting, rapid cooling, and solidifying are repeated for the surface layer. In this case, oxygen in the air and the metal of the surface layer react with each other to form an oxide. The inventors have confirmed that such an oxide is formed when the aluminum alloy is collides with stainless steel powders having diameters of φ 0.2 to 1.2 m at a high speed of 50 to 100 mm per second.

When the nonferrous metal forming the ODU case is an aluminum alloy, the occurrence of remelting due to collide the powder causes formation of an oxide film mainly containing aluminum oxide ($Al_2O_3$) on the outer surface of the aluminum alloy. Such an oxide itself has high corrosion resistance. Further, the oxide film formed on the surface by the power collision is thicker than an oxide film formed by natural oxidation of the surface.

The outer surface of the aluminum alloy is micronized by rapid heating and rapid cooling. The metal organization is accordingly denser than the inside of the aluminum alloy, and thus the corrosion resistance of the case of ODU 1 is increased. An oxide alloy formed on a base material surface has hardness higher than that of the base material, and thus it is expected that abrasion resistance and damage resistance will be increased.

The concave-convex patterns including continuous collision traces are formed on the entire surface of the case by spraying the stainless powders. It is desirable to set, for the surface roughness of the concave-convex patterns, Ra (center line average roughness) within the range of several to several tens of μm to prevent adhesion of fingerprints to the metal case surface. The average diameter of the concave patterns set to the surface roughness within this range is φ several hundreds of μm.

The example of colliding the aluminum alloy surface with the stainless steel powder has been described. However, when hard but weak alumina or glass beads, other than the stainless steel powder, collide with the aluminum alloy surface at high speed, not only an oxide film is formed as in the case of the stainless steel powers but also the powders are further crushed to bite into and melt in the aluminum alloy surface layer. Accordingly, in addition to the aluminum, when stainless steel powder is used, other metal elements are scattered as oxide alloys on the surface, it is possible for corrosion resistance to expectedly provide effects equal to or better than those when the stainless steel powders are sprayed.

As described above, according to the present invention, hard but thin powders collides with the outer surface of the nonferrous metal case at high speed, and the heat that is generated by the collision impact causes modification of the outer surface layer of the nonferrous metal case. Thus, even in the case of nonferrous metals other than the aluminum alloy, whose melting points are relatively low (e.g., around 1000° C.), formation of a metal oxide on the surface by a similar operation can be expected, and they can be used as materials for the case of ODU 31.

As described above, the modified case surface is denser than metallographic structure in the nonferrous metal forming case 32, and the oxide film is funned thicker than natural film. Accordingly, corrosion resistance and durability are improved compared with the surface-unprocessed nonferrous metal (refer to FIGS. 21A and 22A and FIGS. 22A and 22B). Thus, the case has high environment resistance as case 2 for housing the transmission/reception circuit of ODU 1 installed in the very adverse outdoor environment.

Figure 21:
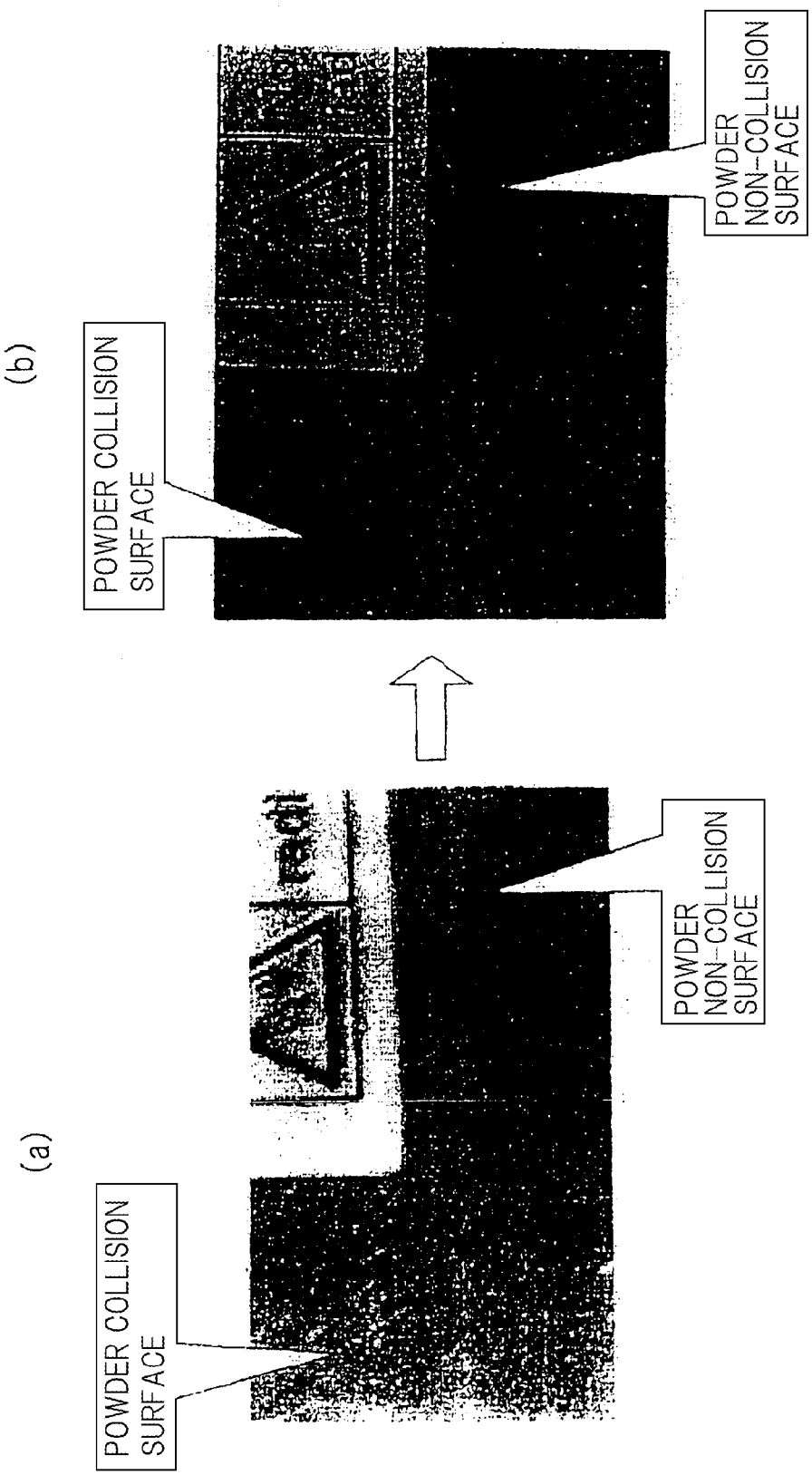
FIG. 21 is views showing case surfaces before and after the passage of 192 hours in corrosion gas testing.

FIGS. 21A and 21B are views showing case surfaces before and after the passage of 192 hours in corrosion gas testing. The specification of this corrosion gas testing complies with the standard of IEC 61587-I. As shown in FIG. 21A, a surface with which powders collide and a surface with which powders do not collide are formed on the surface of the case of ODU 31, sulfur oxide gas ($SO_2$ concentration: 25 ppm) is continuously sprayed for 96 hours to the case surface, and then hydrogen sulfide gas ($H_2S$ concentration: 10 ppm) is continuously sprayed for 96 hours. In this testing, an ambient temperature is 40° C., and an ambient humidity is 80% RH. After the passage of 192 hours in such corrosion gas testing, almost no color change occurred on the power-collided surface compared with the non-powder-collided surface (refer to FIG. 21B).

Figure 22:
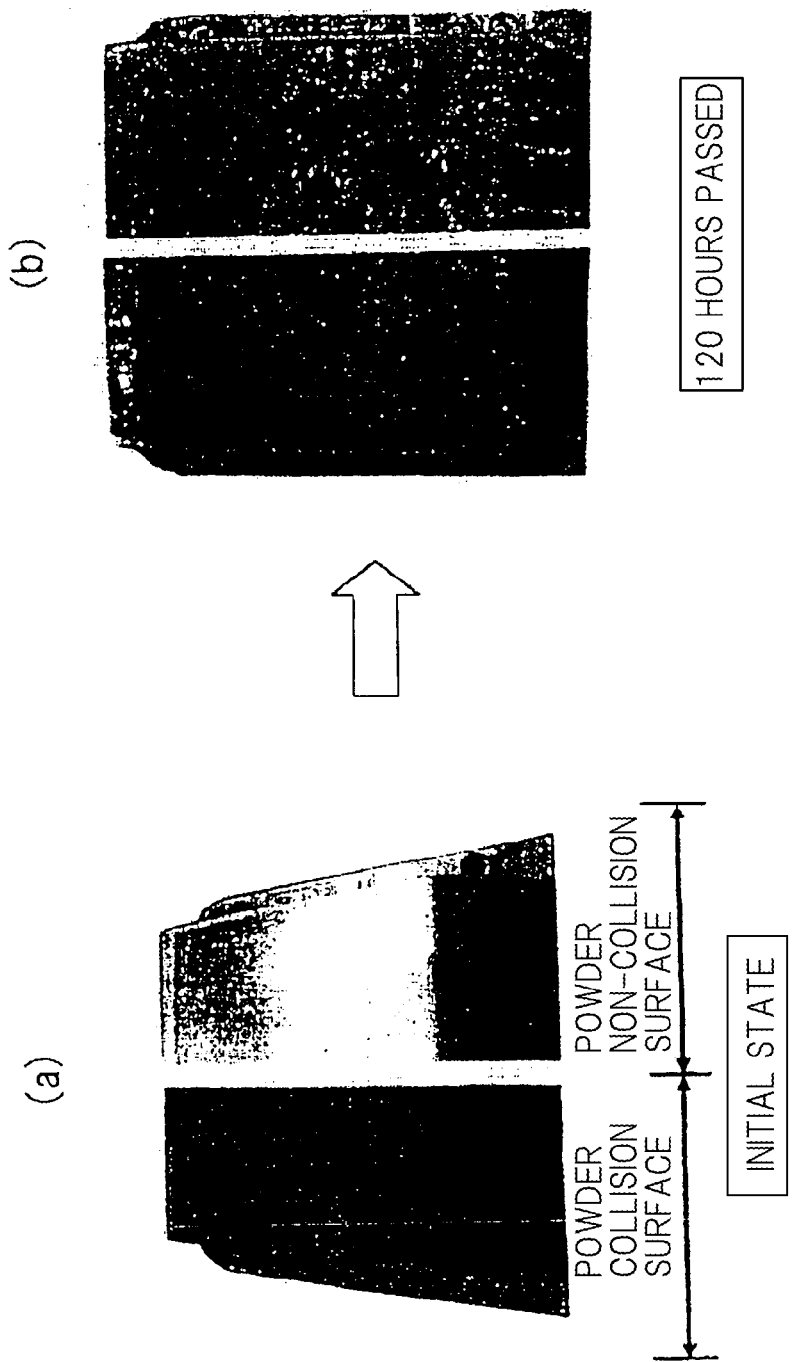
FIG. 22 is views showing case surfaces before and after the passage of 120 hours in salt spray testing.

FIGS. 22A and 22B are views showing case surfaces before and after the passage of 120 hours in salt spray testing. The specification of this salt spray testing complies with the standard of IEC 60068-2-11. As shown in FIG. 22A, a surface with which powders collide and a surface with which powders do not collide are formed on the surface of the case of ODU 31. Salt water having a concentration of 5% was continuously sprayed at a temperature of 35° C. for 120 hours to the case surface. Even after the passage of 120 hours in this salt spray testing, almost no color change occurred on the power-collided surface compared with the non-powder-collided surface (refer to FIG. 22B).

Thus, the present invention has confirmed an improvement in corrosion resistance and durability by corrosion gas testing and salt spray testing.

Since such a case surface has high corrosion resistance and high durability, expensive painting on the case surface is unnecessary. Since a painting operation using organic solvents is not necessary, a case that addresses environmental concerns can be provided.

Further, by selecting a particle diameter, a material and a collision speed for the collision powder, the case surface can have surface roughness Ra where the adhesion of finger prints is difficult.

Due to collision with the powder, concave-convex patterns are formed on the case surface which causes an increase in the surface area, and simultaneously the case surface is exposed without being covered with any resin paint. Thus, improvement in heat radiation of the case can be expected.

Figure 23:
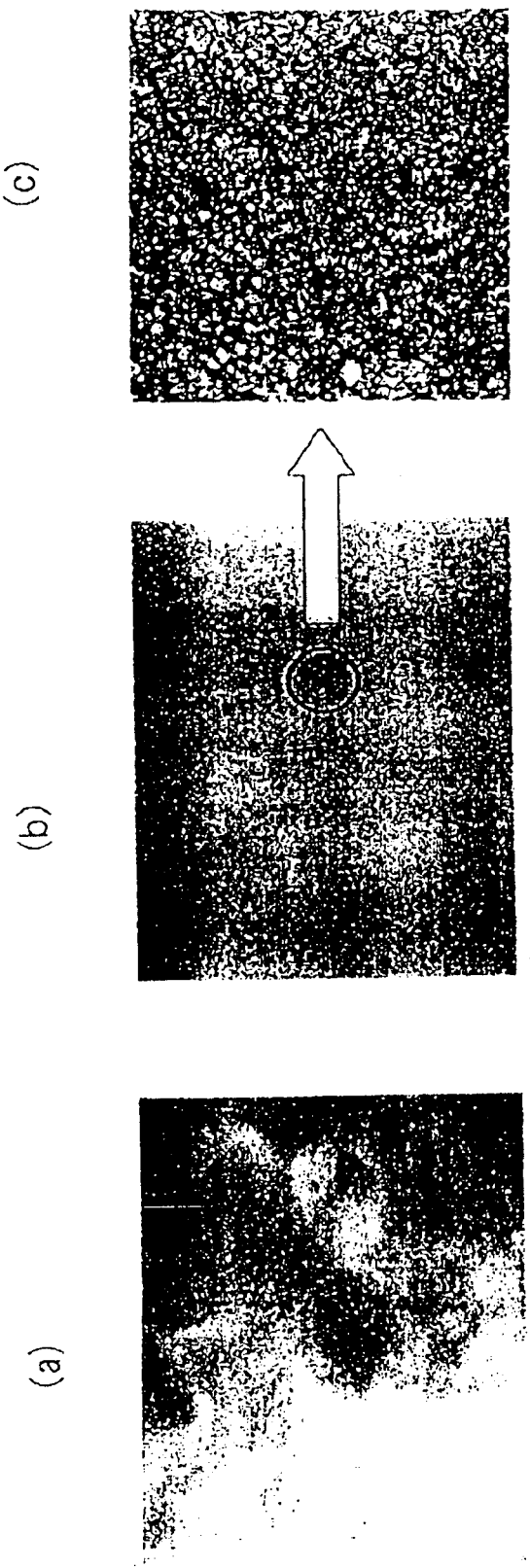
FIG. 23 is views showing a case outer surface improved in appearance by removing, by collision with powders, flecked patterns (hot-water flow patterns) on a cast surface when the case of the ODU shown in FIG. 17 is casted.

When the case is formed by the die-cast method (mold casing method), hot-water flow patterns are formed on the surface and appear in the state in which the case is removed from the mold (refer to FIG. 23A). As a product, the case does not have a nice looking appearance. According to the present invention, a surface treatment process is performed in which fine-particle powder is made to uniformly collide with the case surface. Thus, a case surface where such hot-water flow patterns on the surface of the cast product disappear, and simultaneously where very small concave-convex patterns are uniformly formed by collision traces is realized (refer to FIGS. 23A and 23B). FIG. 23A shows the photograph of a cast case surface where hot-water flow patterns are formed, and FIG. 23B shows the photograph of the case surface where very small concave-convex patterns are uniformly formed by collision traces (with magnification equal to that in FIG. 23A). FIG. 23C shows the magnified photograph (50 times) of a portion surrounded with a circle shown in FIG. 23B.

APPLICATION EXAMPLE

Figure 24:
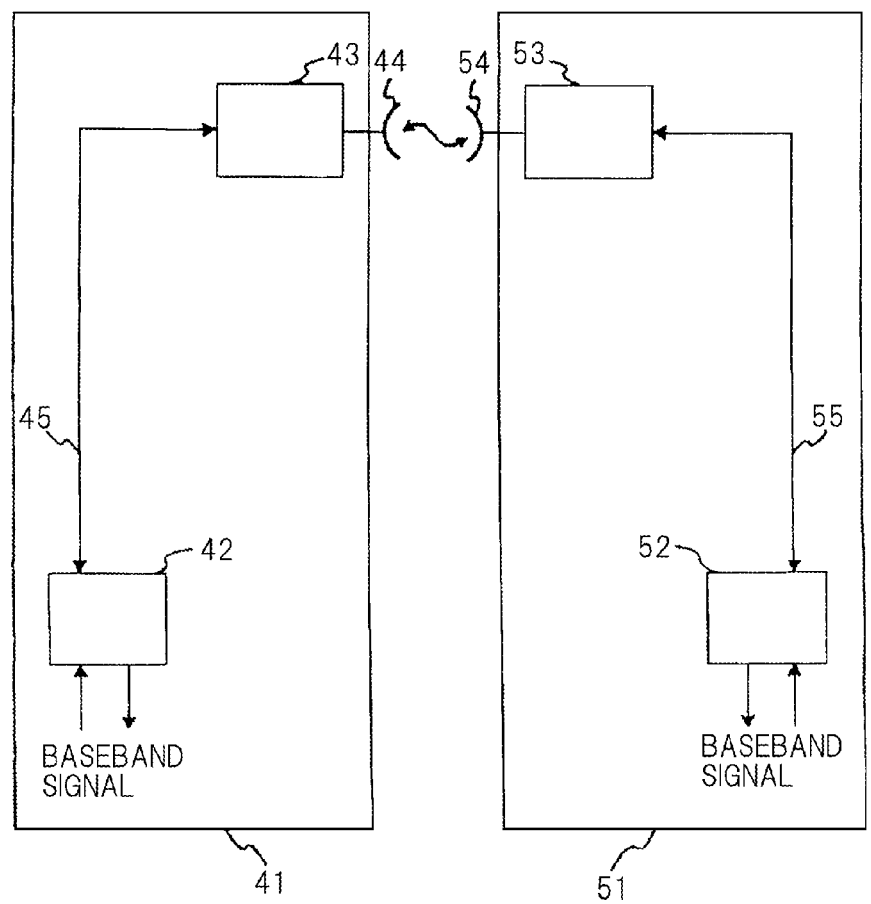
FIG. 24 is a block diagram showing an example of a wireless communication system including the wireless transmission/reception apparatus according to the present invention.
Figure 25:
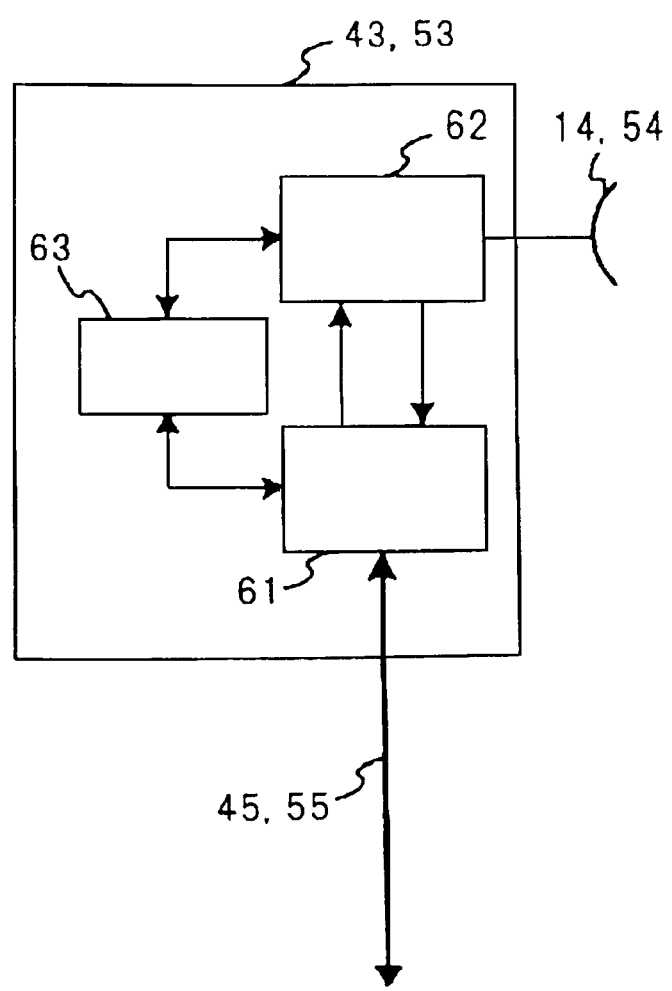
FIG. 25 is a block diagram showing an example of a circuit housed in the wireless transmission/reception apparatus shown in FIG. 24.

FIG. 24 is a block diagram showing an example of a wireless communication system including the wireless transmission/reception apparatus according to the present invention. FIG. 25 is a block diagram showing an example of a circuit housed in the wireless transmission/reception apparatus shown in FIG. 24.

In FIG. 24, A station 41 (B station 51) includes IDU 42 (52) for inputting/outputting a baseband signal of one system and for modulating/demodulating the baseband signal, ODU 43 (53) which is a wireless transmitter/receiver, in which one coaxial cable 45 (55) serves as an interface between IDU 42 (52) and ODU 43 (53), and antenna 44 (54) is connected to ODU 43 (53) to carry out wireless transmission/reception with the opposite station.

As shown in FIG. 25, ODU 43 (53) of A station 41 (B station 51) includes multiplexer circuit 61, transmission/reception circuit 62, and control circuit 63. In the configuration shown in FIG. 25, transmission/reception circuit 62 that integrates a transmission circuit and a reception circuit is mounted. However, the transmission circuit and the reception circuit can be separately arranged.

Multiplexer circuit 61 of ODU 43 (53) has a function of separating a multiple signal input from the IDU side via coaxial cable 45 (55), supplying DC power to each circuit, and outputting a control signal to control circuit 63. Multiplexer circuit 61 further has a function of separating and extracting a modulation wave to output it to transmission/reception circuit 62, and a function of outputting a demodulation intermediate frequency signal input from transmission/reception circuit 62 to the IDU.

Transmission/reception circuit 62 of ODU 43 (53) has a function of converting the modulation wave input from multiplexer circuit 61 into a wireless frequency signal to transmit it from antenna 44 (54), and a function of converting the wireless frequency signal received through antenna 44 (54) into a demodulation intermediate frequency signal to output it to multiplexer circuit 61.

Control circuit 33 of ODU 43 (53) has a function of carrying communication control between the IDU and the ODU, and a function of monitoring the control of ODU 43 (53).

In the wireless communication system of such a configuration, the multiple signal input from IDU 42 (52) to ODU 43 (53) is separated into DC power, a control signal and a modulation wave by multiplexer circuit 61, and the modulation wave is output to transmission/reception circuit 62. The modulation wave input to transmission/reception circuit 62 is converted into a wireless frequency signal (RF signal) by transmission/reception circuit 62, and transmitted to the opposite station via antenna 44 (54). The RF signal received from the opposite station through antenna 44 (54) is converted into a demodulation intermediate signal by transmission/reception circuit 62, and output to IDU 42 (52) via multiplexer circuit 61 and coaxial cable 45 (55). In the example shown in FIG. 24, in one base station, the IDU and the ODU are separated. However, the present invention can be applied to a case where the IDU and the ODU are integrated.

The embodiments of the present invention have been described. Needless to say, however, the present invention is not limited to the embodiments. Various changes can be made to be implemented without departing from the technical ideas of the invention.

This application claims priority from Japanese Patent Application No. 2010-219081 filed Sep. 29, 2010, which is hereby incorporated by reference herein in its entirety.

The invention claimed is:

1. A communication apparatus installed outside comprising:
    a transmission unit for transmitting a signal;
    a reception unit for receiving the signal;
    a waveguide connected to an external antenna and configured to receive/transmit the signal; and
    a case for housing the transmission unit and the reception unit,
    wherein the waveguide is formed as an integral part of the case, and a taper is formed in a part of a tube hole of the waveguide.

2. The communication apparatus according to claim 1, wherein the tube hole of the waveguide is inclined at a predetermined angle in the taper.

3. The communication apparatus according to claim 1, wherein the taper is formed so that an inner diameter size of the waveguide can be smaller toward one end of the waveguide.

4. The communication apparatus according to claim 3, wherein the inner diameter size of the waveguide is fixed at a predetermined distance from at least one end of the waveguide.

5. A communication apparatus installed outdoors comprising:
    a transmission unit for transmitting a signal;
    a reception unit for receiving the signal;
    a waveguide connected to an external antenna and configured to receive/transmit the signal; and
    a case for housing the transmission unit and the reception unit,
    wherein the waveguide is formed as an integral part of the case, and includes a straight shape portion having an inner diameter size fixed from one end to the other end of the waveguide and a tapered shape portion inclined at a predetermined angle.

6. The communication apparatus according to claim 5, wherein the straight shape portion includes two pairs of parallel side faces constituting four corners and four corner portions respectively formed at the four corners, the corner portions being formed into round shapes R, and the tapered shape portion including two pairs of side faces inclined at predetermined taper angles.

7. The communication apparatus according to claim 6, wherein the corner portions of the straight shape portion are formed into the round shapes R so that curvature radiuses can be larger closer to the tapered shape portion.

8. The communication apparatus according to claim 5, wherein the straight shape portion is formed from one end to the other end of the waveguide, and following the straight shape portion, the tapered shape portion is formed so that an aperture of the waveguide becomes smaller toward the other end of the waveguide.

9. The communication apparatus according to claim 5, wherein the tapered shape portion is formed with a predetermined length so that an aperture of the waveguide becomes smaller from one end to the other end of the waveguide, and following the tapered shape portion, the straight shape portion is formed with a fixed aperture from the tapered shape portion to the other end of the waveguide.

10. The communication apparatus according to claim 5, wherein at least one of the straight shape portion and the tapered shape portion is formed at two stages or more in a longitudinal direction of a waveguide portion.

11. The communication apparatus according to claim 5, further comprising a sim for connecting the waveguide portion included in the antenna with the waveguide,
    wherein the sim includes a cylindrical portion slidably inserted into a tube hole of the waveguide, and the waveguide includes the straight shape portion on a side where the sim is inserted.

12. The communication apparatus according to claim 11, wherein a range of the waveguide into which the sim is inserted includes the straight shape portion.

13. The communication apparatus according to claim 11, wherein an inner diameter size of the cylindrical portion of the sim is roughly equal to a size of an aperture at an end of the waveguide opposite the side where the sim is inserted.

14. A communication apparatus installed outdoors comprising:
    a transmission unit for transmitting a signal;
    a reception unit for receiving the signal;
    a waveguide connected to an external antenna and configured to receive/transmit the signal; and
    a case for housing the transmission unit and the reception unit,
    wherein the waveguide is formed as an integral part of the case, and an outer surface of the case is formed into a concave-convex shape without being painted.

15. The communication apparatus according to claim 14, wherein a taper is formed in a part of a tube hole of the waveguide.

16. The communication apparatus according to claim 15, wherein in the taper, the tube hole is inclined at a predetermined angle.

17. The communication apparatus according to claim 15, wherein the taper is formed so that an inner diameter size of the waveguide can be smaller toward one end of the waveguide.

18. The communication apparatus according to claim 15, wherein the straight shape portion is formed at at least one end of the waveguide.

19. The communication apparatus according to claim 15, wherein the inner diameter size of the waveguide is fixed at a predetermined distance from at least one end of the waveguide.

* * * * *